Feb. 17, 1953  J. O. DOCKINS  2,628,718
SEED CLEANER AND GRADER
Filed July 21, 1950  5 Sheets-Sheet 1

INVENTOR
JAMES O. DOCKINS
BY
McMorrow, Berman & Davidson
ATTORNEYS

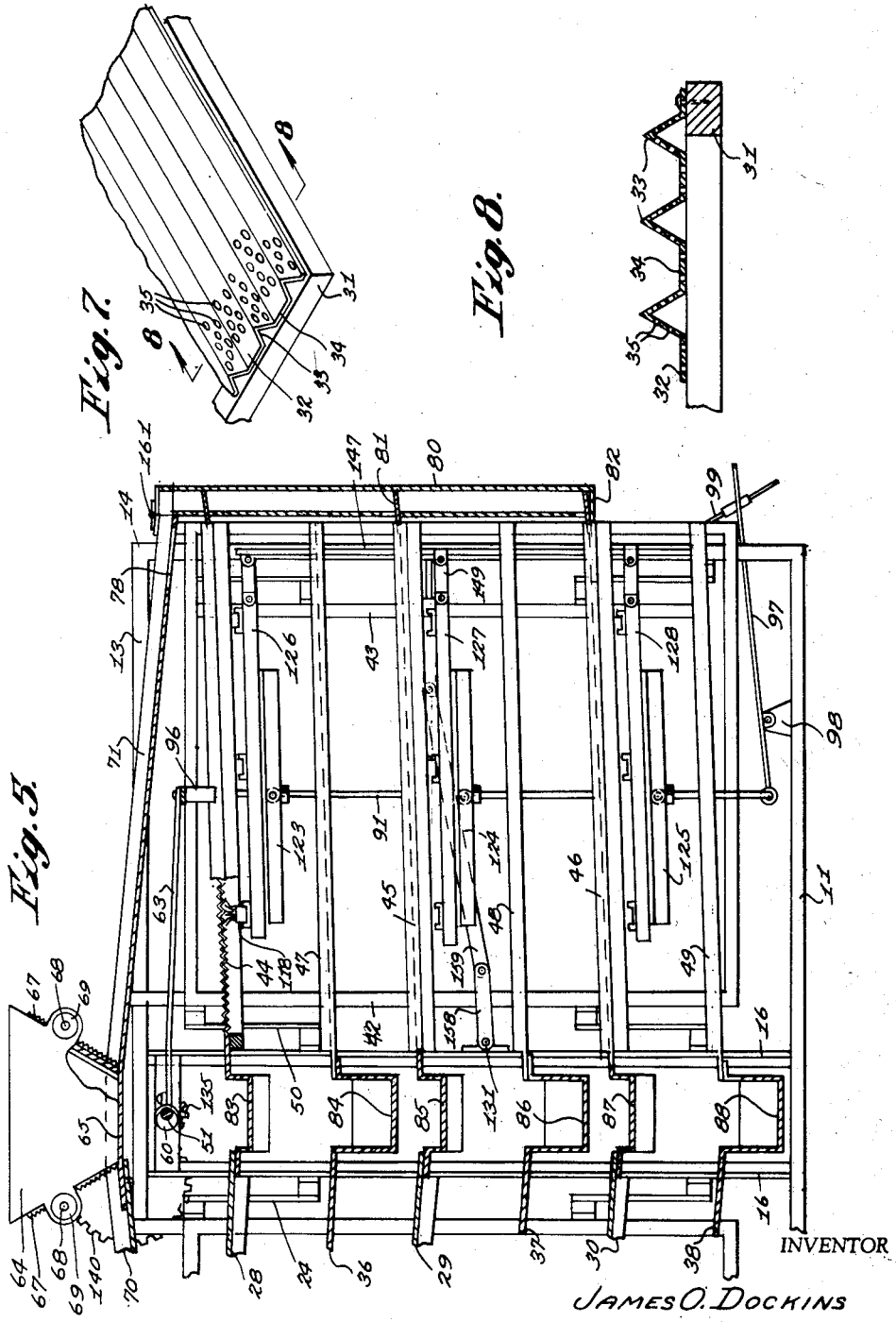

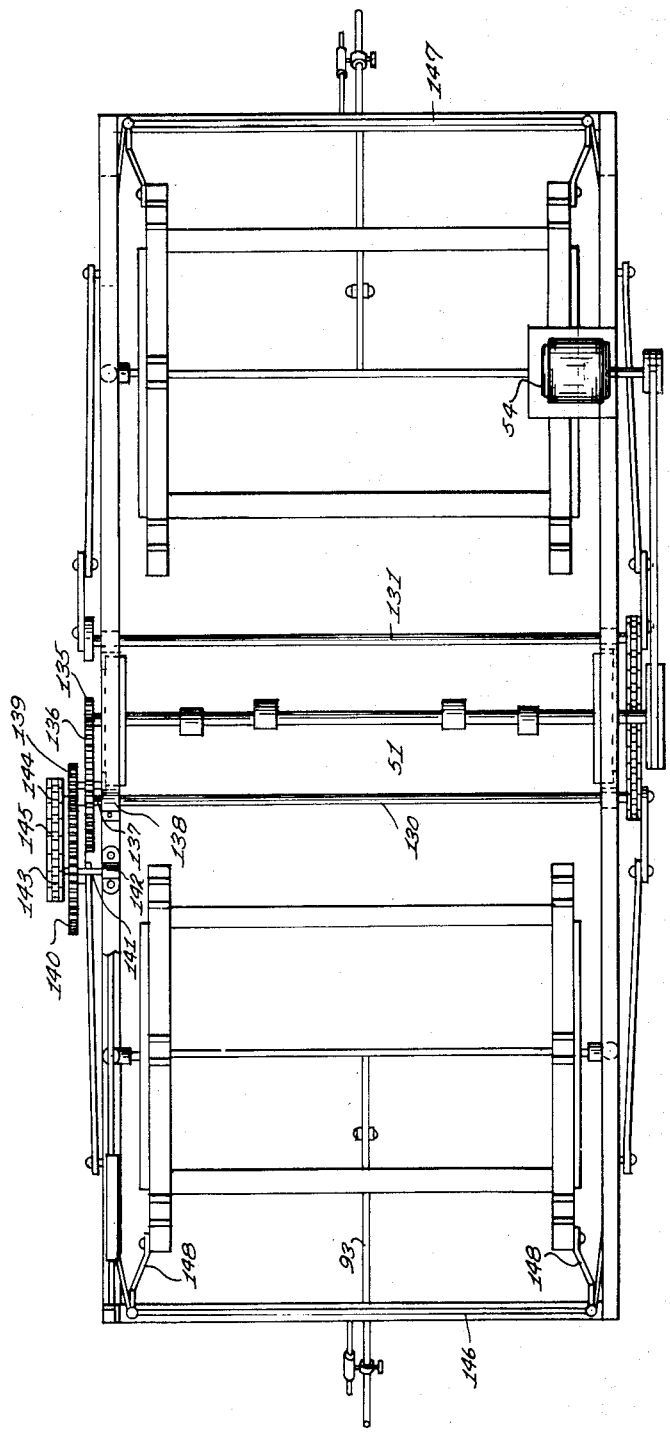

Patented Feb. 17, 1953

2,628,718

UNITED STATES PATENT OFFICE 2,628,718

SEED CLEANER AND GRADER

James O. Dockins, Stuttgart, Ark.

Application July 21, 1950, Serial No. 175,070

2 Claims. (Cl. 209—240)

This invention relates to a seed cleaning or grading machine and more particularly to a power operated machine for separating crop seed or grain of a predetermined or standardized size from bulk seed containing foreign seed and crop seed varying from the desired size.

It is among the objects of the invention to provide an improved seed grader of large capacity which is effective to clean and grade grain or seed at a rapid rate, which separates grain or seed of a predetermined size from the residue in bulk grain or seed and delivers the separated grain or seed to one side of the machine constituting the grader or cleaner, and the residue to the other side of the machine so that the residue will not be remixed with the separated grain or seed, which has grain or seed separating screens of improved design and high efficiency, which includes duplicate mechanisms operating in opposition to each other to suppress vibration and reduce power consumption, which provides a uniform distribution of the grain or seed to the several screens included therein, and which is simple and durable in construction, economical to manufacture, and positive and efficient in operation.

Other objects and advantages will become apparent from a consideration of the following description and the appended claims in conjunction with the accompanying drawings wherein:

Figure 5 is a longitudinal cross sectional view of a fragmentary portion of the seed grader taken on the line 5—5 of Figure 2;

Figure 6 is a perspective view of a brush rack constituting an operative component of the device;

Figure 7 is a perspective view of a fragmentary portion of a grading screen illustrative of the invention;

Figure 8 is a fragmentary cross sectional view on the line 8—8 of Figure 7; and

Figure 9 is a top plan view of the grading machine with the seed hopper and distributing tables removed from the top of the machine.

Figure 1:
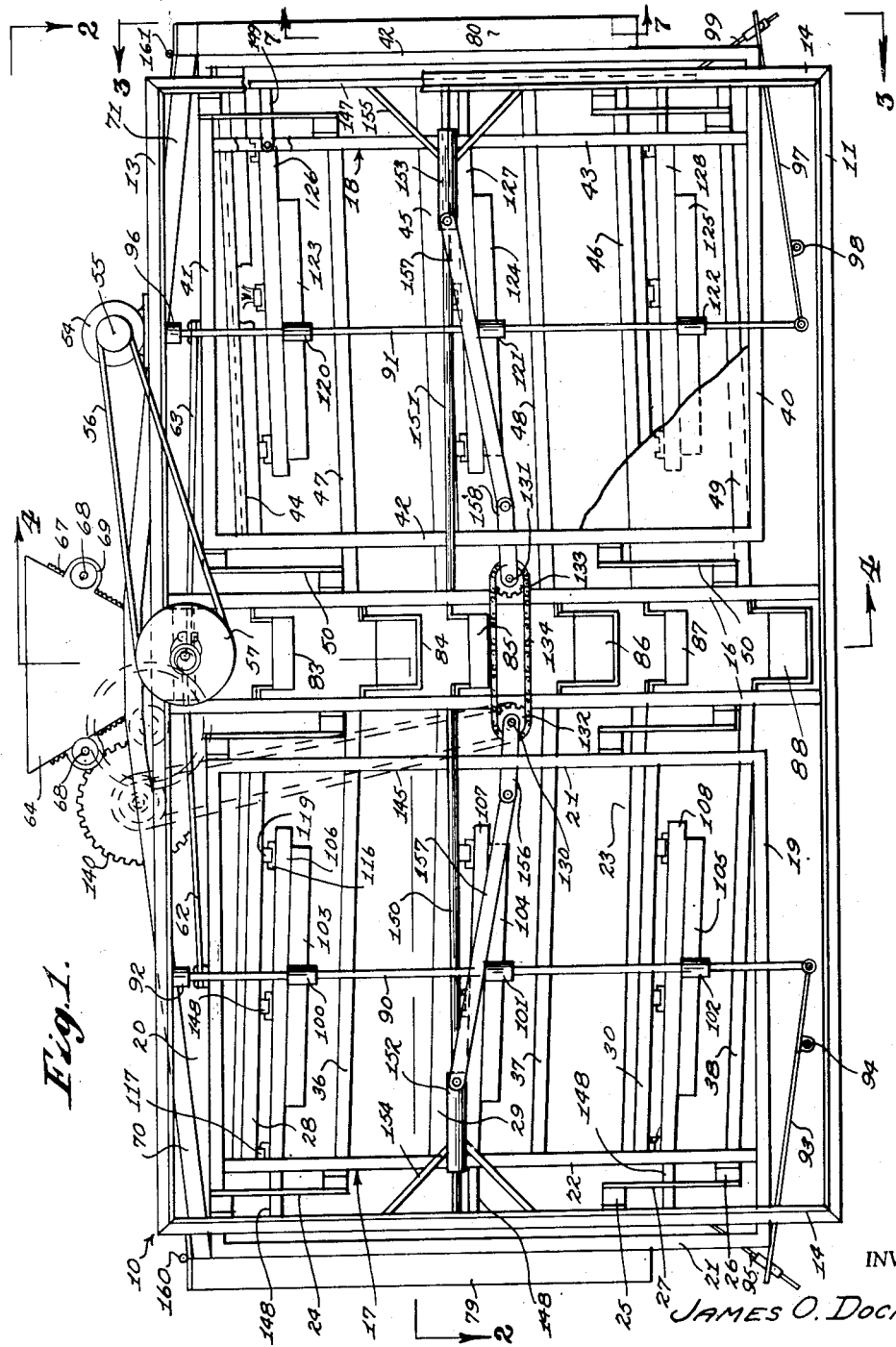
Figure 1 is a side elevational view of a seed grader illustrative of the invention.
Figure 2:
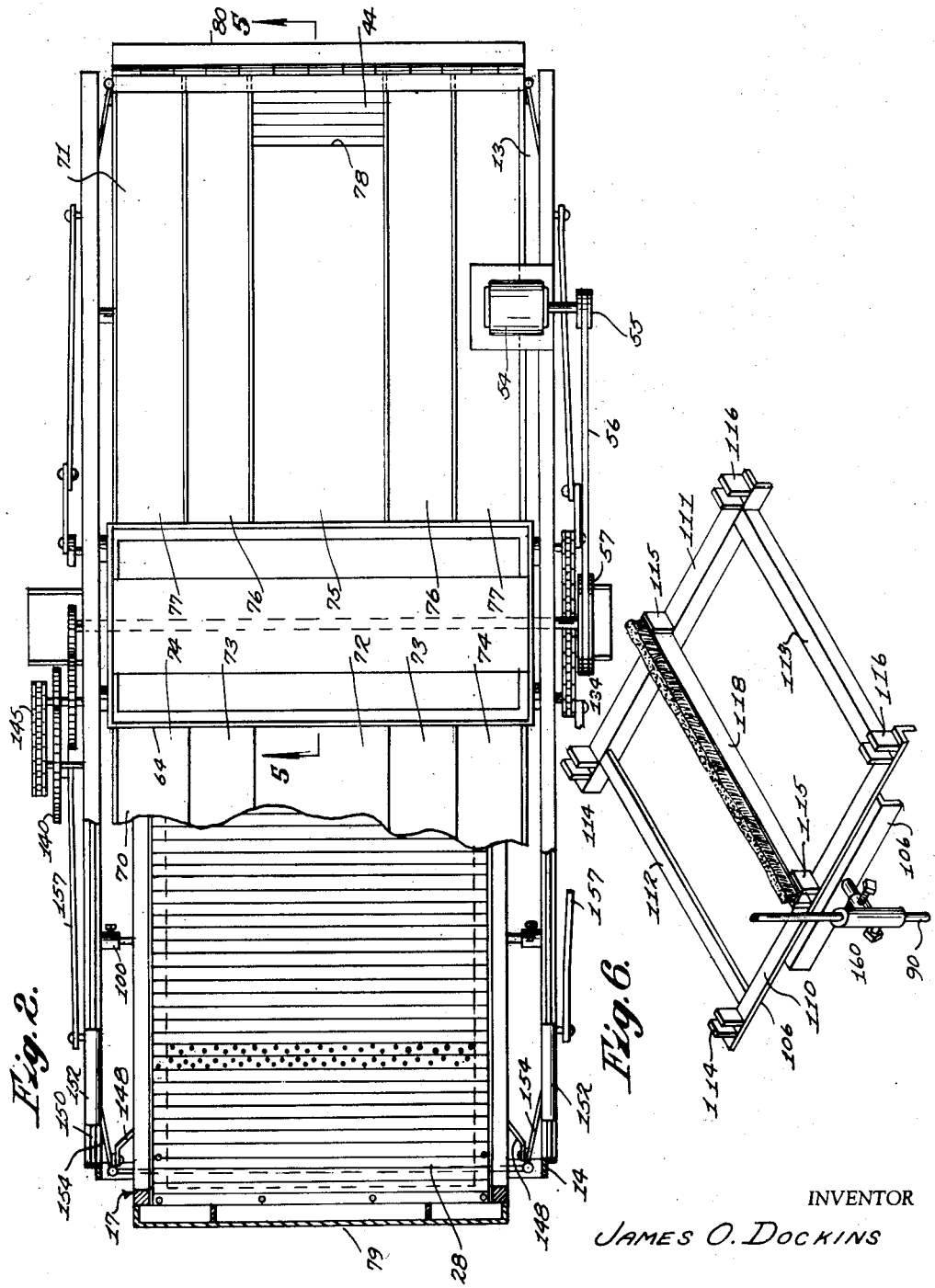
Figure 2 is a top plan view of the seed grader illustrated in Figure 1 with a portion broken away and shown in cross section to better illustrate the construction thereof.

With continued reference to the drawings, the machine comprises a rigid and fixed main frame, generally indicated at 10, of elongated rectangular shape and formed of suitable structural elements, such as lengths of commercial angle iron of suitable size.

This main frame includes a rectangular base comprising two spaced apart and substantially parallel side members 11, and two end members 12, each of which is joined at its opposite ends to the two side members 11 at the corresponding ends of the latter, an upper rectangular top or platform comprising two spaced apart and substantially parallel side members 13 and two end members 14 joined at their opposite ends to the side members 13 at the corresponding ends of the latter, and corner posts 15 extending between corresponding corners of the base frame and the top frame and supporting the top frame on the base frame.

The main frame further includes posts 16 arranged in pairs with one pair located at each side of the frame and the two posts of each pair disposed at respectively opposite sides of the mid-length location of the main frame and extending between the corresponding lower side frame members 11 and upper side frame members 13.

Two similar grader units, as generally designated at 17 and 18 in Figure 1, are mounted in the main frame 10 and disposed one at each side of the mid-length location of the main frame.

The grader unit 17, which is the left-hand unit as viewed in Figure 1, has a rectangular frame preferably formed of lengths of commercial angle iron of the proper size and including a rectangular bottom portion 19 and a rectangular top portion 20 joined at its corners to the corresponding corners of the bottom portion by the corner posts 21. Auxiliary posts 22 extend between the side members of the upper and lower portions of the grading unit frame spaced from and substantially parallel to each of the outer corner posts 21 for supporting screens and grain tables in the grader unit and the sides of the grader unit frame except the sides facing each other at the mid-length location of the main frame, are closed by suitable covers, as indicated at 23.

The grader unit frame is mounted in the main frame for movement relative to the main frame by eight resilient connectors 24 disposed two between each corner post of the grader unit frame and the adjacent corner post of the main frame with one connector disposed near the upper end and one near the lower end of each of the grader unit frame corner posts. Each of these connectors comprises a block 25 secured to the main frame corner post, a block 26 secured to the grader unit frame corner post and a resilient bar 27 extending between and connected at its respectively opposite ends to the blocks 25 and 26, the bar 27 being disposed between and substantially parallel to the corresponding corner posts of the main frame and the grader unit frame. These resilient connectors permit shaking movement of the grader unit in the main frame.

The grader unit also includes three screens 28, 29 and 30 disposed in spaced apart and superposed relationship in the grader unit frame with the screen 28 near the top of the grader unit, the screen 29 near the mid-height location of the grader unit and the screen 30 near the bottom of the grader unit. Each of these screens extends substantially horizontally in a direction transversely of the grader unit but is inclined downwardly from the outer end of the grader unit to the end of the grader unit adjacent the mid-length location of the main frame.

Each of the screen, as particularly illustrated in Figures 7 and 8, comprises a rectangular wooden frame 31 and a plate 32 of perforated sheet metal mounted on the wooden frame. The sheet metal plate is provided with spaced apart and substantially parallel ridges 33 of inverted V-shaped cross section with flat portions 34 disposed one between each two adjacent ridges. Both the ridges and the flat portions of the plate are provided with perforations 35 which are accurately sized to pass grain or seed of a predetermined size therethrough. The screens are mounted in the grader unit frame so that the ridges 33 extend transversely of the grader unit and of the main frame 10.

Three grain or seed receiving tables 36, 37 and 38 are mounted in the grader unit frame and comprise flat plates which are substantially horizontally disposed transversely of the grader unit and the main frame of the machine and inclined downwardly from the outer end of the grader unit to the end of the latter adjacent the mid-length location of the main frame. The table 36 is disposed below and substantially parallel to the upper screen 28, the table 37 is disposed below and substantially parallel to the middle screen 29, and the table 38 is disposed below and substantially parallel to the bottom screen 30.

The right-hand grader unit 18, as illustrated in Figure 1, has a frame including lower and upper rectangular frame portions 40 and 41, corner posts 42 connecting the corresponding corners of these lower and upper frame portions and auxiliary posts 43. This right-hand unit has an upper screen 44, a middle screen 45 and a lower screen 46 corresponding to the screens 28, 29 and 30 of the left-hand unit and corresponding grain tables 47, 48 and 49 disposed below and substantially parallel to the screens 44, 45 and 46 respectively. This unit 18 is mounted in the main frame by eight resilient connectors 50 which are similarly constructed and similarly located to the connectors 24 described above.

A shaft 51 extends transversely across the main frame 10 at the mid-length locations of the upper main frame side members 13 and is journaled at its ends in suitable bearings 52 and 53 carried by these upper main frame side members. A power plant, such as the electric motor 54, is mounted on the top of the main frame and provided with a belt pulley 55 connected by a V belt 56 with a belt pulley 57 on the corresponding end of the shaft 51, the pulley 57 being larger than the pulley 55 to provide a speed reducing drive between the motor and the shaft.

Four eccentrics 58, 59, 60 and 61 are provided at spaced apart locations on the shaft 51 with the eccentricity of the eccentrics 58 and 59 angularly removed substantially 180 degrees from the eccentricity of the eccentrics 60 and 61. Arms 62, of suitable resilient material, are rotatably connected each at one end, one to the eccentric 58 and one to the eccentric 59 and these arms are secured at their opposite ends to the top portion of the frame of the grader unit 17 substantially at the mid-length location of the top portion of the frame of this unit. Similar arms 63, of resilient material, are rotatably connected each at one end to the eccentrics 60 and 61 respectively and are secured at their other ends to the top frame portion 41 of the unit 18 at the mid-length location of this top frame member.

With this arrangement, when the motor 54 is in operation rotating the shaft 51, the two units 17 and 18 are shaken in the main frame 10, the shaking movements of these units being in opposition to each other to suppress vibration in the machine and reduce the amount of power required.

A feed hopper 64 is mounted on the top of the main frame and extends transversely of the main frame above the space between the upright posts 16. The hopper 64 has a flat bottom 65 connected to one of the units 17 or 18 so that this bottom is shaken during the operation of the machine and has two substantially parallel and upwardly diverging side walls each of which is provided with a longitudinally extending opening along the adjacent edge of the bottom wall. A cover plate 66 is disposed against the inner side of each side wall of the hopper in covering relationship to the corresponding slot and each of these cover plates is provided at its opposite ends with racks 67. Shafts 68 extend, one along the outer side of each side wall of the hopper and these shafts are provided with gears which extend through the side walls of the hopper and mesh with the racks 67, and with handwheels 69 so that the shafts can be rotated to raise and lower the cover plates 66 to thereby adjust the size of the feed slots.

A grain distributing table 70 extends from the adjacent side of the hopper 64 over the top of the grader unit 17 and a similar table 71 extends from the other side of the hopper over the top of the grader unit 18.

Spaced apart and substantially parallel partitions extend longitudinally of the table 70 and provide between them five grain distributing troughs including a center trough 72, two intermediate troughs 73 disposed at respectively opposite sides of the center trough 72, and two outer troughs 74 disposed at the outer sides of the corresponding intermediate troughs 73. The distributing table 71 is similarly divided into a center trough 75, two intermediate troughs 76, and two outer troughs 77.

The center trough 72 is made somewhat shorter than the top screen 28 of the unit 17 to provide at the outer end of this trough a feed opening, not illustrated, through which the grain flowing along this center trough from the hopper 64 falls on the top screen 28 of the unit 17. The trough 75 is similarly constructed to provide an opening 78 through which the grain falls onto the top screen 44 of the unit 18.

A chute structure 79 is mounted on the unit frame at the outer end of the unit 17 and a similar chute structure 80 is mounted on the unit frame at the outer end of the unit 18.

Figure 3:
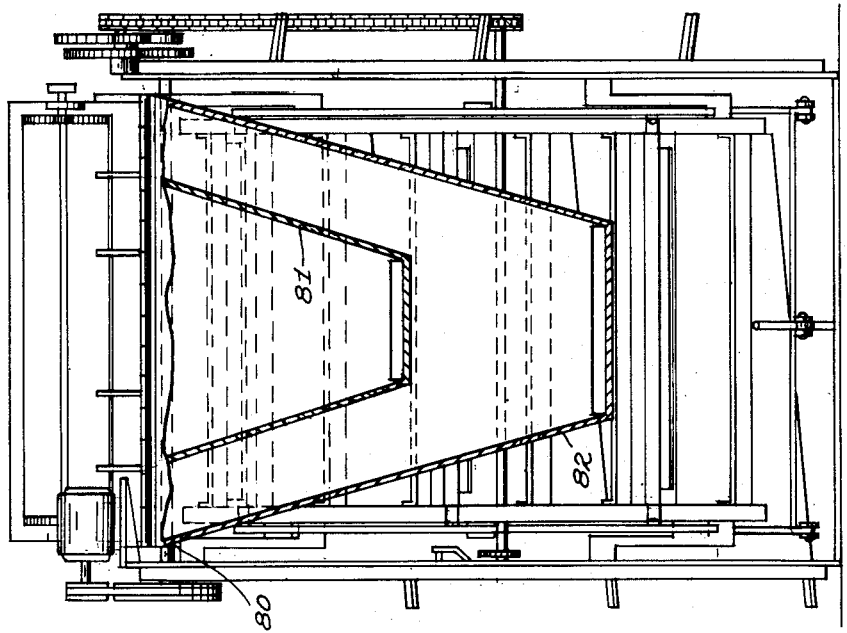
Figure 3 is a cross sectional view on the line 3—3 of Figure 1.
Figure 4:
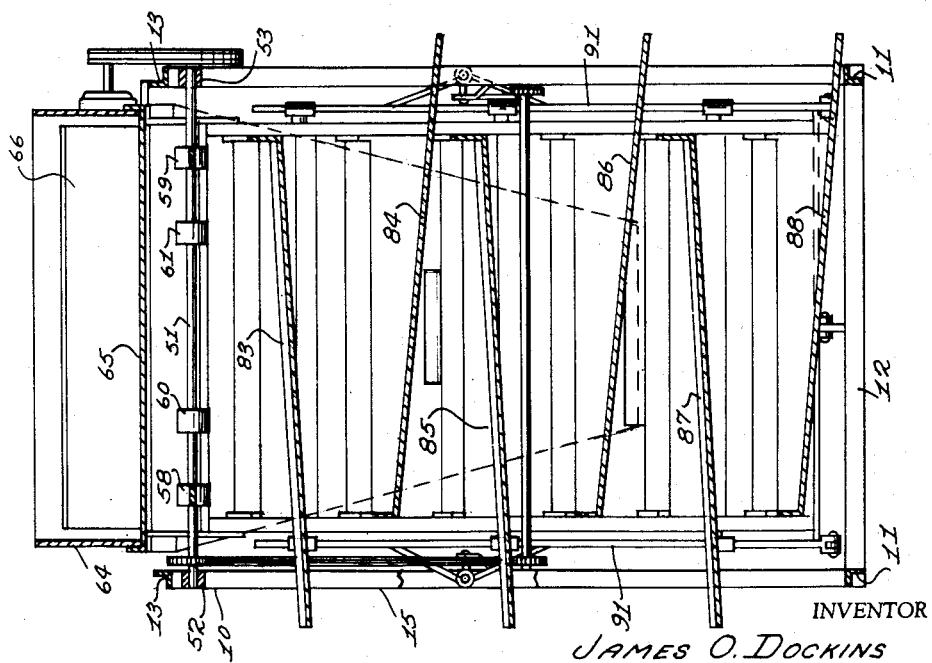
Figure 4 is a transverse cross sectional view on the line 4—4 of Figure 1.

As particularly illustrated in Figure 3, the chute structure 80 includes a downwardly tapering inner chute 81 which connects the two intermediate troughs 76 with the outer end of the middle screen 45 of the unit 18 and a downwardly tapering outer chute 82 which connects the two outside troughs 77 with the outer end of the bottom screen 46 of the unit 18.

The chute structure 79 includes an inner chute connecting the intermediate trough 73 with the middle screen 29 of the unit 17 and an outer chute connecting the outside trough 74 with the bottom screen 30 of this unit.

With this arrangement, the grain or seed from the hopper 64 is uniformly distributed to the outer ends of all of the screens of the machine. As the grading units of the machine are shaken in the main frame by the power plant 54, the grain fed to the outer ends of the screens passes along the screens toward the mid-length location of the main frame. Grain of the proper size falls through the screens onto the corresponding grain tables and continues to move toward the center of the machine while the residue remains on top of the screens.

Grain or seed discharge troughs, as indicated at 83, 84, 85, 86, 87 and 88 extend transversely of the main frame of the machine at the mid-length location of the latter and between the vertical posts 16 at the opposite sides of the mid-length location of the main frame. Of these, the trough 83 is disposed between the adjacent ends of the two upper screens 28 and 44, the trough 85 is disposed between the adjacent ends of the two middle screens 29 and 45, and the trough 87 is disposed between the adjacent ends of the two bottom screens 30 and 46. These troughs receive the residue from the tops of the screens and are all inclined toward one side of the machine. The trough 84 is disposed between the adjacent ends of the upper grain tables 36 and 47, the trough 86 is disposed between the adjacent ends of the middle grain tables 37 and 48, and the trough 88 is disposed between the adjacent ends of the bottom grain tables 38 and 49, these troughs receiving the separated grain or seed from the grain tables and all being inclined toward the opposite side of the machine so that the separated grain is delivered at one side of the machine and the residue is delivered at the other side of the machine to avoid any possibility of remixing the residue with the separated grain. All of these grain delivery troughs may be of rectangular cross sectional shape and have a length slightly greater than the width of the main frame of the machine so that the grain and the residue is delivered to the outside of the machine.

Two vertically disposed rods 90 are mounted on the main frame, one at each side of the grader unit 17 and substantially midway the length of this grader unit and two similar rods 91 are mounted in vertically disposed position on the main frame, one at each side of the grader unit 18 and substantially midway the length of this grader unit.

Each of the rods 90 is received at its upper end in a sleeve 92 secured to the main frame and a lever 93 is pivotally connected at one end to the lower ends of the rods 90 and pivotally mounted intermediate its length on the main frame 10 by a pivotal mounting 94. The other end of the lever 93 projects outwardly of the outer end of the main frame and an adjustable length strut 95 is connected between this other end of the lever 93 and the main frame for adjustably raising and lowering the corresponding rods 90.

Each rod 91 is received at its upper end in a sleeve 96 secured to the main frame and a lever 97 is pivotally connected at one end to the lower ends of the rods 91 and pivotally mounted intermediate its length on the main frame 10 by a pivotal mounting 98. The other end of the lever 97 projects beyond the corresponding outer side of the main frame and an adjustable length strut 99 is connected between this other end of the lever 97 and the main frame for adjustably raising and lowering the rods 91 and holding such rods in adjusted position.

Three sleeve brackets 100, 101 and 102 are mounted on each of the rods 90 at spaced apart locations therealong and are connected to brush frame guides 103, 104 and 105 which are disposed between the two rods 90 and respectively positioned immediately below the screens 28, 29 and 30.

These brush frame guides are formed of angle iron or other suitable material, and are movable toward and away from the adjacent screens by means of the adjustable length struts 95.

Rectangular brush frames 106, 107 and 108 are slidably mounted on the brush frame guides or carriers 103, 104 and 105 respectively, and each of these frames carries three elongated brushes the bristles of which are in contact with the under side of the adjacent screen.

One of the brush frames, for example, the brush frame 106, is particularly illustrated in Figure 6, and comprises four lengths of angle iron 110, 111, 112 and 113 connected together at their ends to provide a rectangular structure having a width substantially equal to the width of the adjacent screen 28 and a length less than the length of the screen by approximately one third of the screen length.

The members 110 and 111 extend longitudinally of the screen at the respectively opposite side edges of the latter and each of these members carries three upwardly projecting pairs of lugs or stops, as indicated at 114, 115 and 116, the pairs of stops 114 and 116 being disposed at the respectively opposite ends of the corresponding side members 110 and 111 and the pairs of stops 115 being disposed substantially at the mid-length location of these side members.

An elongated brush 117 is secured at its ends between the two stops of the two pair of stops 114 and extends transversely of the screen with its bristles in contact with the under surface of the screen. A similar brush 118 is mounted in the stops 115 and a third brush 119 is mounted in the stops 116.

The two rods 91 are provided with sleeve brackets 120, 121 and 122 at spaced apart locations therealong and these brackets carry brush frame guides 123, 124 and 125 respectively positioned below the corresponding screens 44, 45 and 46.

Rectangular brush frames 126, 127 and 128, similar to the frame 106 particularly illustrated in Figure 6 and described above, are slidably mounted on the guides 123, 124 and 125 respectively and each of these frames carries three spaced apart and elongated brushes the bristles of which contact the under surfaces of the adjacent screens 44, 45 and 46.

Two shafts 130 and 131 extend transversely of the main frame of the machine substantially at the mid-height location of the latter and are journaled in bearings carried on the outer sides of the intermediate posts 16 of the main frame, the shaft 130 being disposed between the grader unit 17 and the adjacent posts 16 and the shaft 131 being disposed between the grader unit 18 and the adjacent post 16. Chain sprockets 132 and 133 are secured one on each of the shafts 130 and 131 at the same side of the frame and these sprockets are connected by a chain 134 so that both of the shafts 130 and 131 will rotate in the same direction and at substantially the same speed.

The motor driven eccentric shaft 51 is drivingly connected at its end remote from the belt pulley 57 with the shaft 130 by a reduction gear mechanism and chain drive particularly illustrated in Figure 9.

The reduction gear mechanism comprises a gear 135 mounted on the corresponding end of the eccentric shaft 51 and meshing with a gear 136 which is larger than the gear 135 and is mounted on a stub shaft 137 journaled in a bearing 138 on the main frame. The stub shaft carries a second gear 139 smaller than the gear 136 which meshes with a gear 140 which is larger than the gear 139 and is mounted on a stub shaft 141 journaled in a bearing 142 mounted on the main frame. A chain sprocket 143 is mounted on the stub shaft 141 and a corresponding chain sprocket 144 is mounted on the corresponding end of the shaft 130 and the sprockets 143 and 144 are drivingly connected by a drive chain 145.

The reduction gear train provides a speed for the shafts 130 and 131 which is approximately one per cent of the speed of the eccentric shaft 51 so that if the eccentric shaft rotates at a speed of approximately three hundred revolutions per minute the shafts 130 and 131 will rotate at a speed of three revolutions per minute.

A rectangular structure 146, conveniently formed of round iron stock, is disposed at the outer end of the main frame adjacent the outer end of the grader unit 17 and a similar rectangular structure 147 is disposed at the opposite end of the main frame. The brush frames 106, 107 and 108 are connected at their ends adjacent the rectangular structure 146 to this structure by pivoted links 148 and the brush frames 126, 127 and 128 are connected to the rectangular structure 147 by the pivoted links 149.

Two crosshead guides 150 extend longitudinally along the part of the main frame including the unit 17, and are disposed one at each side of the main frame and substantially at the mid-height location of the latter and similar crosshead guides 151 extend along the part of the main frame in which the unit 18 is disposed. Tubular crossheads 152 are slidably mounted one on each of the crosshead guides 150 and similar tubular crossheads 153 are slidably mounted one on each of the crosshead guides 151. Each of the crossheads 152 is connected to the rectangular structure 146 by a brace structure 154 and each of the crossheads 153 is connected to the rectangular structure 147 by a corresponding brace structure 155.

Crank arms 156 are provided on the shaft 130 one near each end of the shaft and each of these crank arms is connected to the adjacent crosshead 152 by a pitman 157. Similar crank arms 158 are provided on the shaft 131 near respectively opposite ends of this shaft and each of these crank arms is connected to the adjacent crosshead 153 by a pitman rod 159.

Each of the crank arms 156 and 158 has a length substantially equal to one sixth of the length of the screens so that each brush carried by one of the brush frames moves over substantially a third of the length of the corresponding screen and the three brushes together sweep the entire under surface of the screen. These brushes dislodge any seed which may become stuck in the screen apertures and keep the apertures or perforations open for a continuous flow of properly sized grain or seed therethrough.

The machine illustrated has six different screens arranged in parallel and the seed or grain to be graded is fed continuously and uniformly to all of these screens at the same time. The machine thus has a large capacity for its over-all size and will sort or grade a large quantity of seed in a short time.

The two chute structures 79 and 80 are hinged at their upper edges to the unit frames 17 and 18 respectively by the hinges 160 and 161 so that these structures can be swung outwardly away from the unit frames and the corresponding ends of the screens for cleaning the screens and interchanging the screens when necessary or desired. These chute structures are latched in operative position by suitable spring hooks or clamps, not illustrated, connected between the chute structures and the unit frames of the machine.

Each of the screens preferably includes a flat and imperforate plate portion at the grain receiving end of the screen which plate portion first receives the grain or seed and distributes the grain or seed uniformly to the ridged and perforated portion of the screen.

The screens may be provided in sets of screens having different sized perforations for each set for grading different kinds of seeds or grain and the pressure of the brushes against the under surface of the screens can be accurately adjusted by the levers 93 and 97 and the adjustable length struts 95 and 99.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A seed grader comprising an elongated frame, two grader units mounted in said frame one at each side of the mid-length location of the latter, a power plant disposed adjacent said frame, means carried by said frame and connected to said power plant and said grader units to impart shaking movement to said grader units, each of said grader units including grader screens disposed one above the other, a hopper mounted on said frame at the midlength location of said frame, distributing tables carried by said frame and disposed one at each side of said hopper, said tables extending from said hopper to the ends of the main frame remote from said hopper, and means communicating with said distributing tables at said remote ends for distributing seed uniformly from said hopper to the several screens in the corresponding grader unit, said means comprising a chute adjacent the remote end of each distributing table, said chute having an end thereof overlying one of said screens, and a second chute surrounding said first chute for conveying grain to another of said screens.

2. A seed grader comprising a main frame of elongated rectangular shape, two grader units of rectangular shape movably mounted in said main frame one at each side of the midlength location of the latter, an eccentric shaft journaled on said main frame between said grader units and having sets of oppositely disposed eccentrics thereon, means connecting one set of eccentrics to one of said grader units, means connecting the other set of eccentrics to the other grader unit for movement of said grader units in said main frame in opposition to each other, a power plant drivingly connected to said eccentric shaft, a feed hopper carried by said main frame intermediate the length thereof, distributing tables extending from the respectively opposite sides of said hopper one over each of said grader units for distributing seed from said hopper to the end of said grader units remote from said hopper, each of said grader units comprising a rectangular frame covered on all sides except the side adjacent the other grader unit, screens in said frame disposed in vertically spaced apart relationship to each other and seed receiving tables disposed one below each screen, troughs extending transversely of said main frame between said grader units and disposed one between the adjacent ends of each two screens at the same level and one between the adjacent ends of each two seed receiving tables at the same level, and chute structures disposed one at each end of said main frame and carried by said grader units for distributing seed from the corresponding distributing table to the lower screens of the corresponding grader units, each of said distributing tables having a centrally disposed opening therein for supplying seed to the upper screen of the adjacent grader unit and said chute structure comprising a plurality of chutes for supplying seed to said receiving tables.

JAMES O. DOCKINS.

REFERENCES CITED

The following references are of record in the file of this patent:

UNITED STATES PATENTS

| Number | Name | Date |
|---|---|---|
| 21,227 | Wilcox | Aug. 17, 1858 |
| 344,021 | Vickery | June 22, 1886 |
| 345,177 | Rew | July 6, 1886 |
| 416,464 | Laufenburg | Dec. 3, 1889 |
| 455,845 | Hain | July 14, 1891 |
| 505,723 | Pollock | Sept. 26, 1893 |
| 510,768 | Bisbee | Dec. 12, 1893 |
| 585,695 | Peterson | July 6, 1897 |
| 852,050 | Barbeau | Apr. 30, 1907 |
| 989,686 | Adelsperger | Apr. 18, 1911 |
| 1,731,115 | Taylor | Oct. 8, 1929 |
| 2,020,013 | Bailey | Nov. 5, 1935 |
| 2,035,701 | Greco | Mar. 31, 1936 |
| 2,238,454 | Steele et al. | Apr. 15, 1941 |
| 2,510,741 | Coon | June 6, 1950 |